(12) United States Patent
Smith

(10) Patent No.: US 7,712,931 B1
(45) Date of Patent: May 11, 2010

(54) SWEEP COLLIMATOR

(75) Inventor: Todd J. Smith, Deep River, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 149 days.

(21) Appl. No.: 11/879,581

(22) Filed: Jul. 18, 2007

(51) Int. Cl.
*F21V 13/04* (2006.01)
*F21V 7/04* (2006.01)

(52) U.S. Cl. .................. 362/331; 362/332; 362/334; 362/335; 362/308

(58) Field of Classification Search .................. 362/327, 362/334, 335, 332, 311.01, 311.06–311.1, 362/331, 336, 329, 268, 307–309
See application file for complete search history.

(56) References Cited

U.S. PATENT DOCUMENTS

| | | | | |
|---|---|---|---|---|
| 2,254,961 | A | * | 9/1941 | Harris ........................ 362/327 |
| 6,318,886 | B1 | | 11/2001 | Stopa et al. ................. 362/555 |
| 6,431,728 | B1 | | 8/2002 | Fredericks et al. .......... 362/249 |
| 6,478,453 | B2 | * | 11/2002 | Lammers et al. ............ 362/294 |
| 6,641,284 | B2 | | 11/2003 | Stopa et al. ................. 362/240 |
| 6,724,543 | B1 | * | 4/2004 | Chinniah et al. ............ 359/718 |
| 6,739,738 | B1 | | 5/2004 | Smith ......................... 362/317 |
| 6,851,835 | B2 | | 2/2005 | Smith et al. ................. 362/305 |
| 7,008,079 | B2 | | 3/2006 | Smith ......................... 362/235 |
| 7,079,041 | B2 | | 7/2006 | Fredericks et al. ..... 340/815.45 |
| 7,083,313 | B2 | | 8/2006 | Smith ......................... 362/555 |
| 7,118,261 | B2 | | 10/2006 | Fredericks et al. .......... 362/545 |
| 7,158,019 | B2 | | 1/2007 | Smith ......................... 340/467 |
| 7,222,995 | B1 | * | 5/2007 | Bayat et al. ................. 362/327 |
| 7,401,948 | B2 | * | 7/2008 | Chinniah et al. ............ 362/326 |
| 7,461,960 | B2 | * | 12/2008 | Opolka et al. ............... 362/545 |

* cited by examiner

*Primary Examiner*—Bao Q Truong
(74) *Attorney, Agent, or Firm*—Alix, Yale & Ristas, LLP

(57) ABSTRACT

An optical element is configured for use in conjunction with a directional light source such as an LED to form an illuminator. The optical element includes a light entry surface, a reflector and an emission surface. Each of the light entry, reflector and emission surfaces are surfaces of revolution defined by revolving straight or curved lines about an axis of revolution. The light entry, reflector and emission surfaces are configured to produce a radiation pattern from the illuminator that is collimated in a first direction and divergent or swept in a second direction perpendicular to the first direction.

29 Claims, 13 Drawing Sheets

SWEEP COLLIMATOR

BACKGROUND

The direction of propagation of light emitted by a point source having a hemispherical radiation pattern is controlled to produce a desired light distribution pattern. Particularly, through the use of refraction and internal reflection, an optical element alters the light emission pattern of, for example, a light emitting diode to produce an illumination pattern dictated by the intended use of the device into which the light emitting diode is incorporated.

While not limited thereto in its utility, the novel technology to be described below is particularly well suited for use in combination with light emitting diodes (LED's) and, especially, for use in warning and signaling lights.

Commercially available LED's have characteristic spatial radiation patterns with respect to an optical axis which passes through the light emitting die. These radiation patterns, which are primarily determined by an integral lens, include "Batwing", "Lambertian" and "Side Emission". A common characteristic of all of these radiation patterns is that there is emission in a pattern surrounding the optical axis from one side of a plane containing the light emitting die, the optical axis being oriented perpendicular to this plane. The light generated by an LED is radiated within a hemisphere centered on the optical axis. The distribution of light radiation within this hemisphere is determined by the shape and optical properties of the lens (if any) covering the light emitting die of the LED. Thus, LED's can be described as "directional" light sources, since all of the light they generate is emitted from one side of the device.

When designing light sources for a particular purpose, it is important to maximize efficiency by ensuring that substantially all of the generated light is arranged in a pattern or field of illumination dictated by the end use of the device into which the light source is incorporated. The somewhat limited overall light output of individual LEDs frequently necessitates that several discrete devices be cooperatively employed to meet a particular photometric requirement. Use of arrays of LEDs and their directional emission pattern present peculiar challenges to the designer of warning and signaling lights. Employing LEDs in compact arrays additionally imposes cooling, i.e., "heat sinking", requirements which were not present in the case of prior art warning and signal light design.

SUMMARY

The above-discussed and other problems are addressed, and the above-mentioned design criteria met, by directing substantially all of the light flux provided by a light source through an optical element which, through refraction and reflection of the light rays comprising the flux, creates a desired pattern of illumination. A suitable optical element can be fabricated in a repeating, segmented pattern and thus cooperate with light sources closely spaced in an array. When the light sources comprise LEDs, the diodes may be supported in heat transfer relationship with a thermal energy conduit that efficiently conducts heat produced during the generation of light away from the LEDs. The heat transfer characteristics of an assembly that employs such a thermal energy conduit and one or more light source arrays may be enhanced by the incorporation into the conduit of a device for mechanically imparting motion to fluid within the conduit. Suitable fluids may include ambient air, or contained gasses or liquids. Heat pipes or similar thermal transfer devices may also be suitable.

For purposes of this application, light emitted from an LED can be described as "narrow angle" light emitted at an angle of less than about 35° from the optical axis and "wide angle" light emitted at an angle of more than about 35° from the optical axis as shown in FIG. 11. The initial trajectory of wide angle and narrow angle light may necessitate manipulation by different portions of a reflector and/or optical element to provide the desired illumination pattern.

The above-mentioned novel optical element includes a light entry surface positioned and configured to intercept substantially all of the light rays emanating from the light source. The optical element also defines an emission surface from which the light rays, after redirection as necessary, are radiated in the desired pattern. At least one portion of the emission surface may be configured as a surface of revolution defined by the rotation of a line about an axis of revolution passing through the die of the LED. The axis of revolution of the optical element lies in a plane perpendicular to the optical axis of the LED. Part of the light entry surface intercepting wide angle light is configured to cooperate with a reflector to redirect the wide angle light entering the optical element into an illumination pattern that is collimated in a first direction and divergent in a second direction transverse to the first direction. Likewise, another part of the light entry surface, intercepting narrow angle light, cooperates with part of the light emission surface to redirect the narrow angle light into this same illumination pattern.

In accordance with a preferred embodiment, the reflector of the above-described optical element comprises a pair of internal reflecting surfaces that are spatially displaced on opposite sides of the optical axis of the LED, these reflecting surfaces being mirror images of one another. The reflecting surfaces are surfaces of revolution defined by the rotation of curved lines about the aforementioned axis of revolution. Also in accordance with a preferred embodiment, the portion of the light entry surface intercepting wide angle light is also comprised of a pair of facing, mirror image surfaces that may function to refract light rays incident thereon. These mirror image light interception surfaces are surfaces of revolution defined by the rotation of lines about the axis of revolution. This pair of surfaces, i.e., the first light entry portion of the optical element, cooperates with the second light entry portion of the optical element to define a cavity which may receive part of the light generator, i.e., the LED or other light source. The light generator is arranged to release its light into the cavity defined by light entry surface portions.

According to aspects of the disclosure, the shape of the portion of the light entry surface intercepting narrow angle light is dependent upon the shape of the cooperating portion of the light emission surface. If the second light entry portion functions as a refractor to direct received light into the desired radiation pattern, the cooperating portion of the emission surface will not typically further redirect the light rays. A light entry surface that is convex in the direction of the light source and rotated about the axis of revolution is an example of a surface that will redirect divergent narrow angle light from the light source into the desired radiation pattern. This portion of the light entry surface may be a surface of revolution defined by rotation of a curved line about the above-described axis of revolution. Other light entry surface shapes, such as a surface defined by rotation of a straight line about the axis of revolution, may require a complementary emission surface configured to complete the necessary redirection of light into the desired radiation pattern. One example of such a complementary surface shape may be a surface defined by rotation of a curved line about the axis of revolution, forming a surface that is convex in the downstream direction, i.e., in the direction of radiation of the light. Alternatively, both the light entry and light emission surfaces may be shaped, with a portion of the light re-direction taking place at each surface.

BRIEF DESCRIPTION OF THE DRAWINGS

Referring to the drawings, wherein like numerals refer to like elements in the several Figures.

DETAILED DESCRIPTION OF THE DISCLOSED EMBODIMENTS

Figure 1:
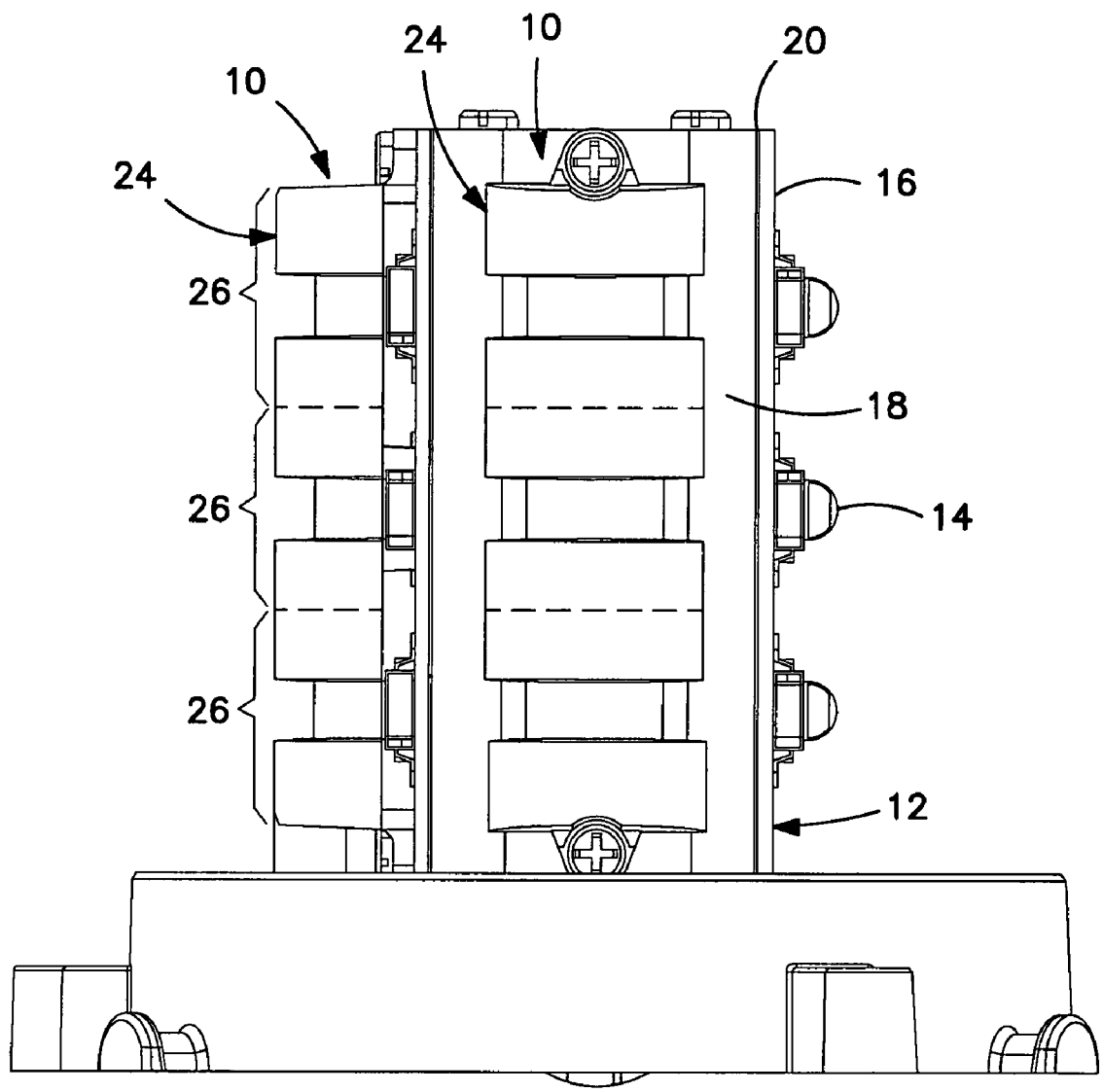
FIG. 1 is a side elevation view of a warning signal light including projection arrays according to aspects of the disclosure, with one optical element array removed.
Figure 2:
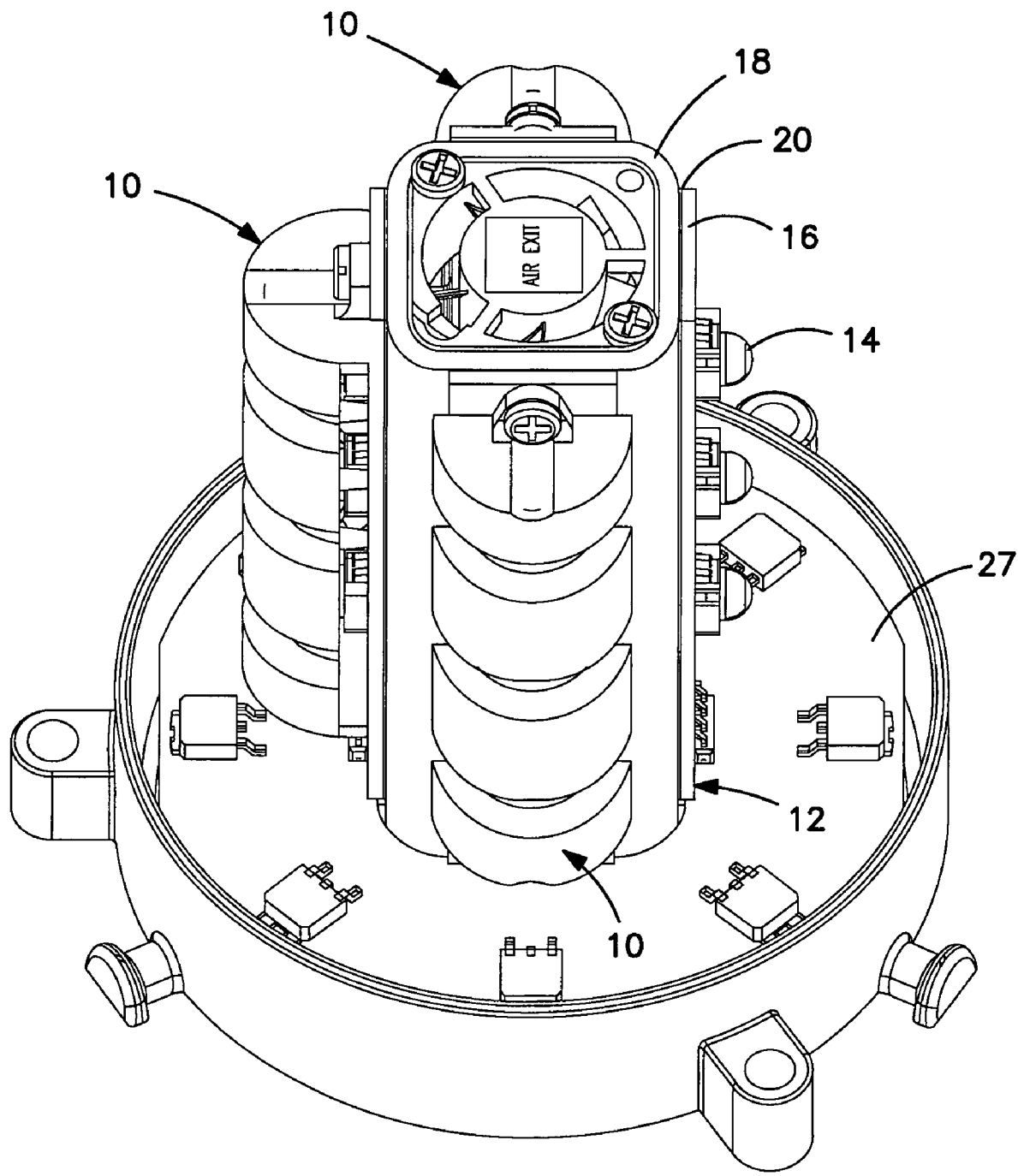
FIG. 2 is a perspective view from above of warning signal light of FIG. 1.
Figure 3:
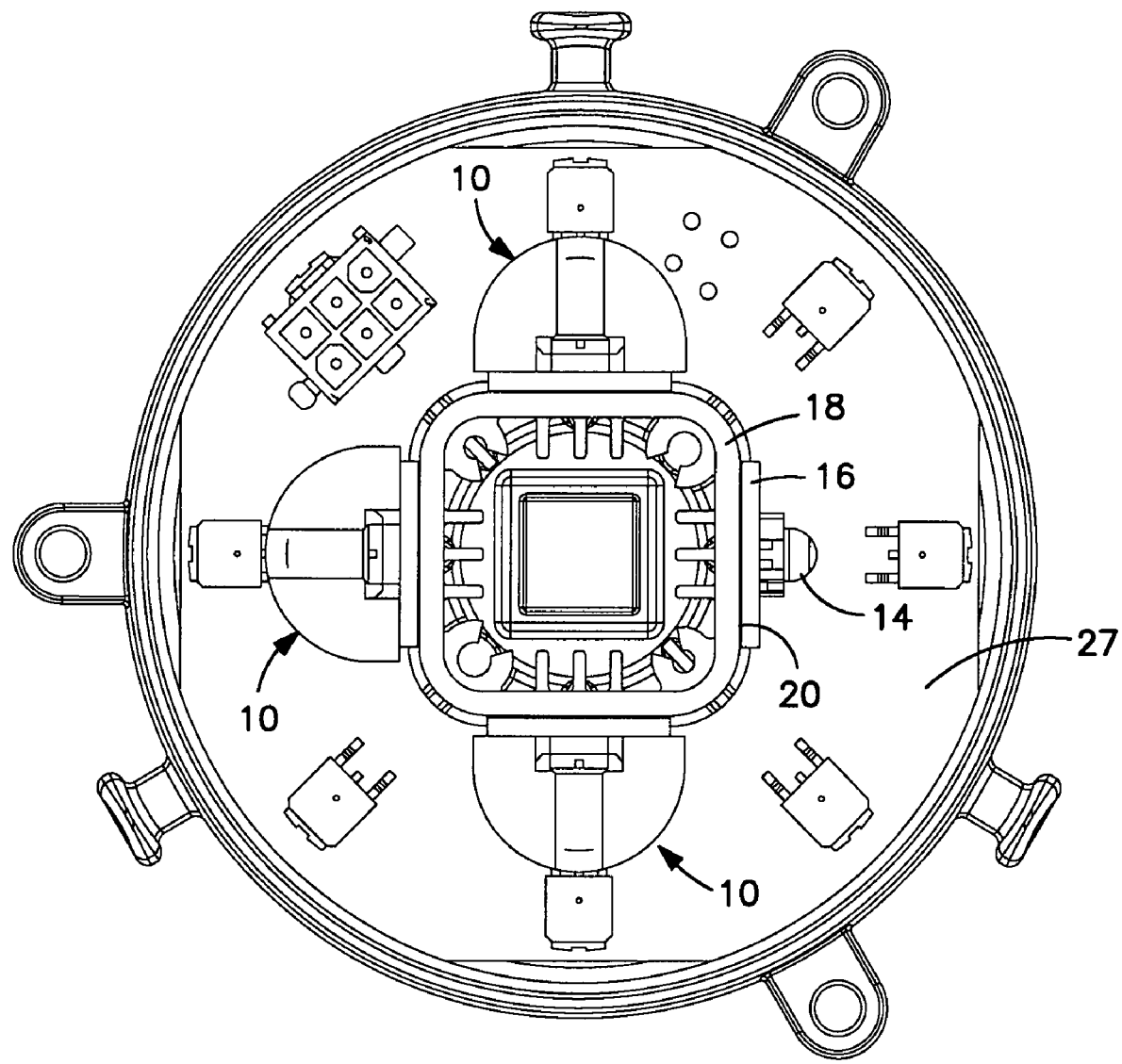
FIG. 3 is a top view of the warning signal light of FIGS. 1 and 2, with the cooling fan removed to show the interior of heat transfer member 18.
Figure 4:
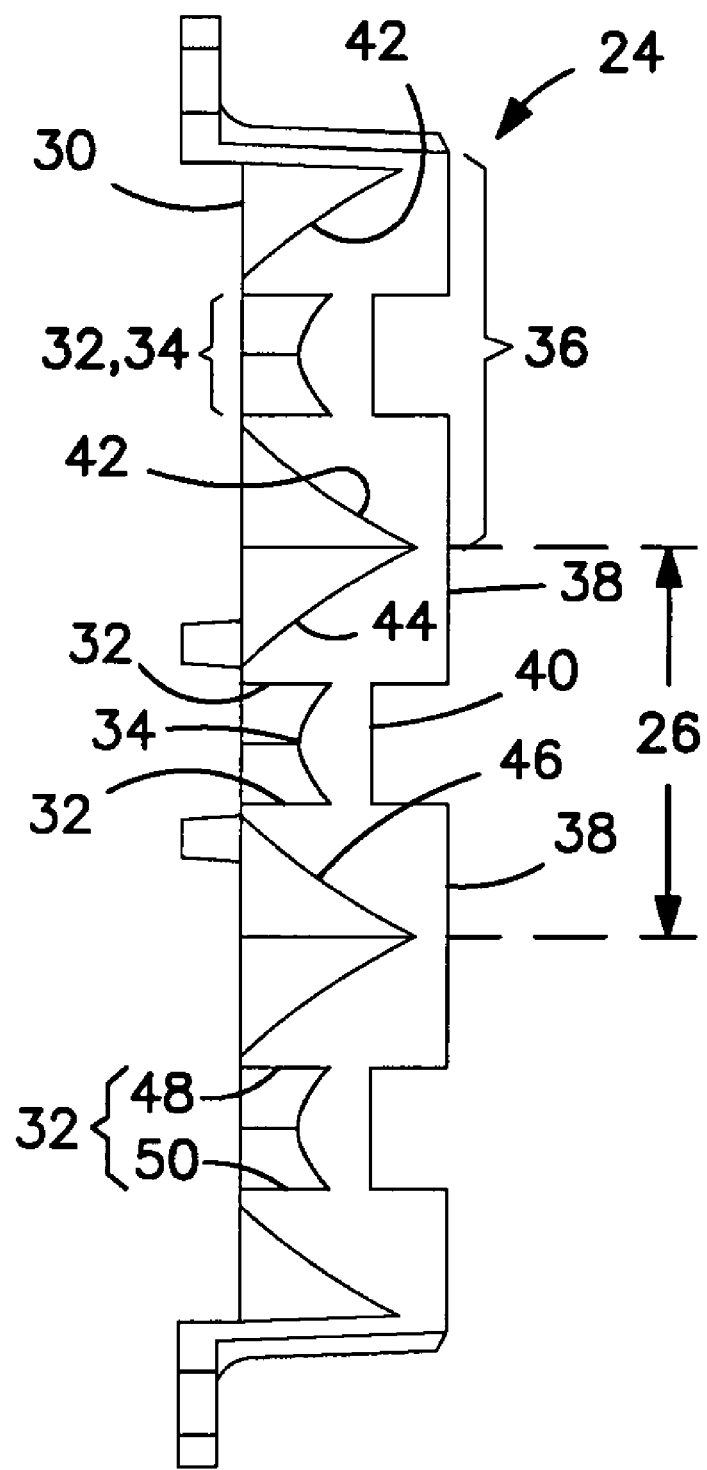
FIG. 4 is a longitudinal sectional view through an optical element array as shown on the warning signal light of FIGS. 1-3.
Figure 5:
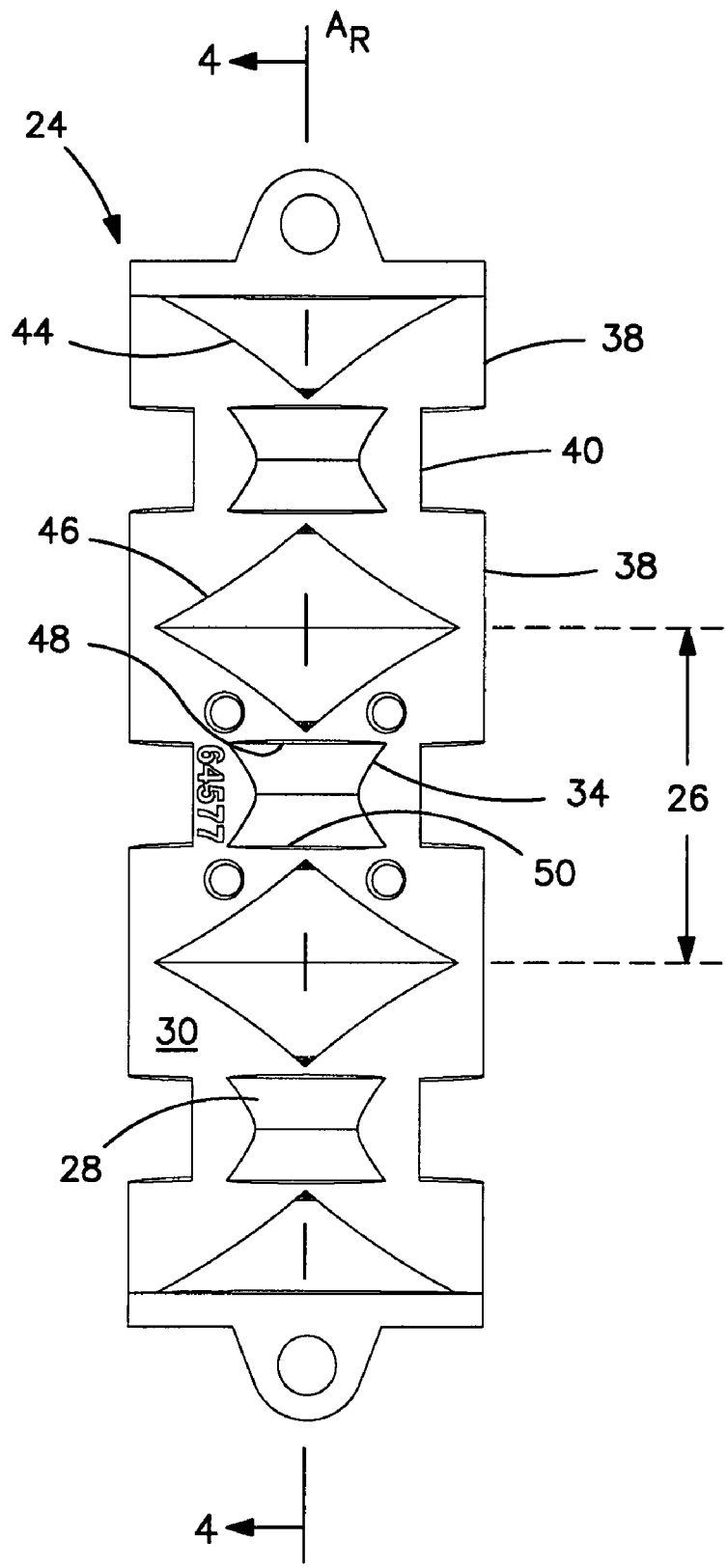
FIG. 5 is an enlarged bottom plan view of the optical element array of FIG. 4.

The apparatus shown in FIGS. 1-3 is designed for use as a warning signal light of the type commonly referred to as a beacon. The beacon is constructed for mounting in the attitude shown in FIG. 1 (vertically), in either a stationary location or on the roof (or other elevated location) of a motor vehicle. The radiation pattern for this type of warning signal light is typically a horizontally directed band where the light is substantially evenly distributed in a 360° pattern surrounding the device. Some states, the Federal government and standard setting bodies such as the Society of Automotive Engineers (SAE) have established standards for the intensity and pattern of light radiation for warning signal lights of this type. One example of such a standard is SAE J845, which sets forth photometric requirements for Class 1, Class 2 and Class 3 warning devices in the warning colors of white, yellow/amber, red and blue.

In order to achieve the requisite light intensity with currently available LEDs, the disclosed beacon employs a plurality of diodes in several linear arrays. The disclosed apparatus utilizes four such arrays, i.e., four projection modules 10, with adjacent arrays being horizontally offset from one another by 90°. Accordingly, the light from each LED needs to be vertically collimated, but allowed to project over an arc in the horizontal direction. For purposes of this application, "vertically collimated" means that light which would diverge upwardly and downwardly from a horizontal plane is redirected into a direction substantially parallel to the horizontal plane. Ideally, the light from each LED will be vertically collimated and evenly dispersed across an arc of approximately 180° in a horizontal direction. In the disclosed embodiment, the LED's may be presumed to have a Lambertian, or hemispherical radiation pattern.

It will be understood by those skilled in the art that the apparatus of FIGS. 1-3 would typically be completed by a transparent outer dome, i.e., a hermetic cover (not shown). That outer dome, for some applications, might perform an optical function. Such an optical function could, for example, be causing a variation(s) in the color of the generated light and/or further redirecting some of the light flux exiting the projection modules.

As noted above, the apparatus of FIG. 1 employs four projection modules 10. Each module 10 comprises a linear array 12 of light sources. Each array in the disclosed embodiment comprises three (3) LED's 14 which are mounted on a printed circuit board 16. In the conventional manner, each LED 14 will include the actual light emitting diode, a lens surrounding the light emission and a heat transmissive "slug" for conveying heat away from the diode. Each circuit board 16 is mechanically secured to a conduit 18, i.e., a tubular heat transfer member. A thermally transmissive gasket 20 is sandwiched between each circuit board 16 and the tubular member 18 to provide electrical insulation between the circuit board and heat sink while efficiently conducting heat between the components mounted on board 16 and the heat transfer member 18.

An array 24 of optical elements 26 is associated with each LED array 12. As may best be seen by joint consideration of FIGS. 4-7, each segment 26 of the optical element arrays 24 defines a cavity 28 which is shaped and positioned so as to receive the integral lens (if present) of an LED 14. The arrays 24, which are fabricated from optical grade plastic such as acrylic or polycarbonate, are mated with respective light source arrays 12 to define the projection modules 10. The optical element arrays 24 are also mechanically secured to the heat transfer member 18. The light source arrays 12 are electrically connected to a circuit board 27, which includes the driver circuitry for the LED's 14.

Figure 6:
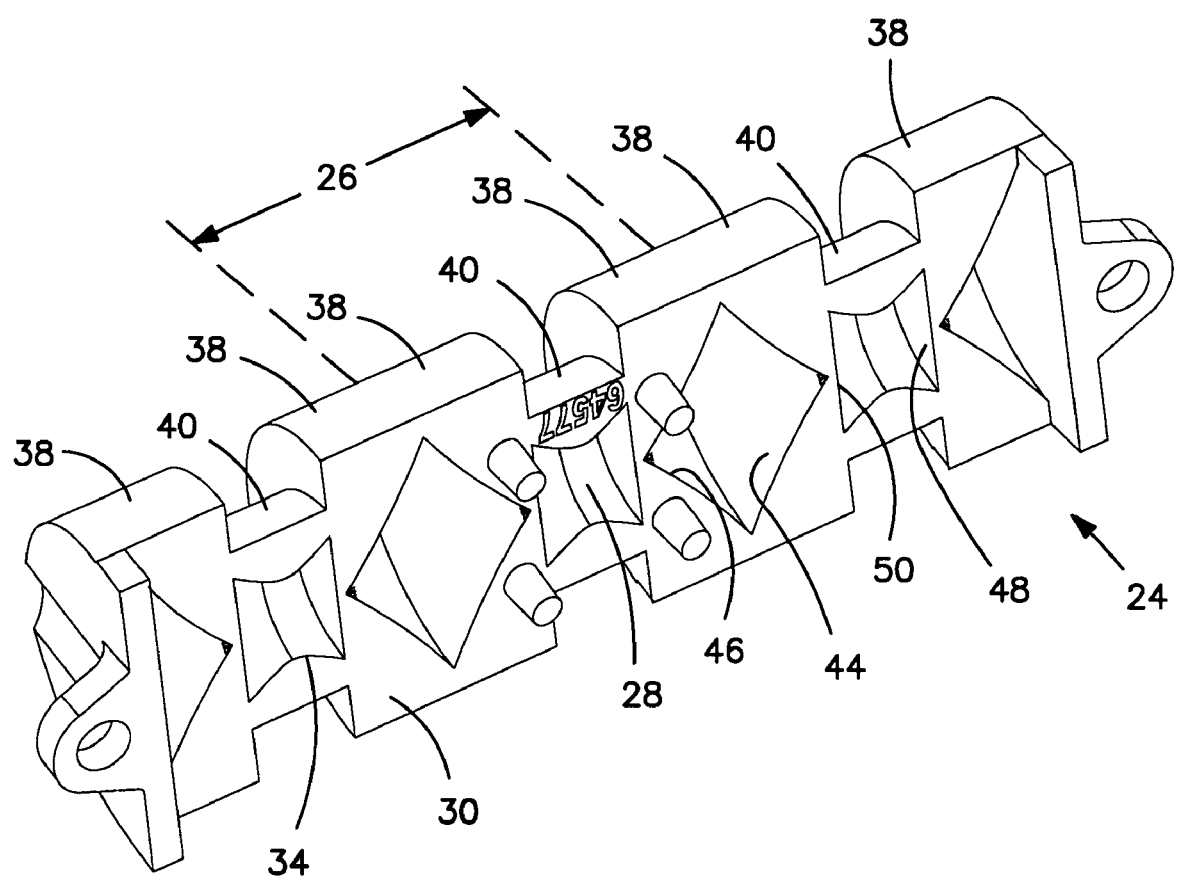
FIG. 6 is an enlarged bottom perspective view of the optical element array of FIGS. 4 and 5.
Figure 7:
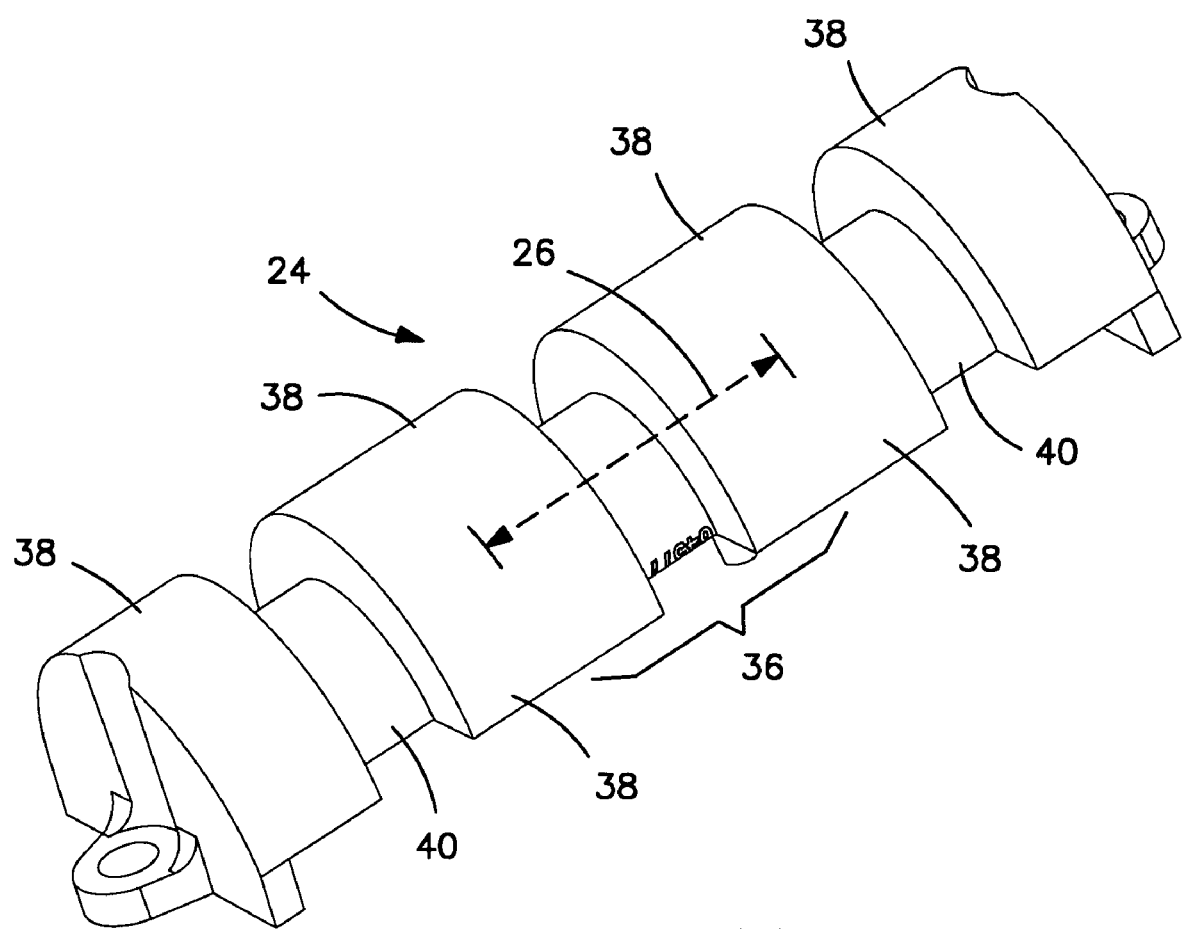
FIG. 7 is an enlarged top perspective view of the optical element array of FIGS. 4-6.
Figure 11:
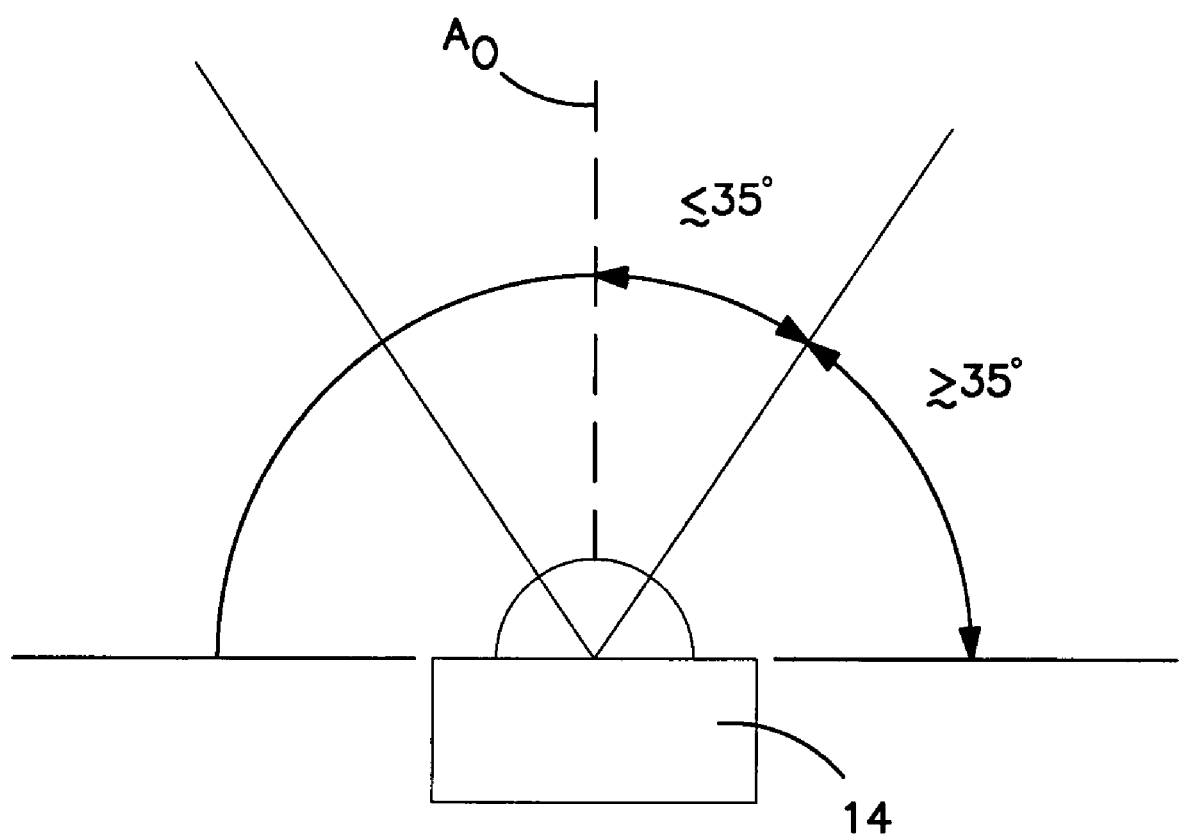
FIG. 11 is a side view of a representative prior art LED.
Figure 12:
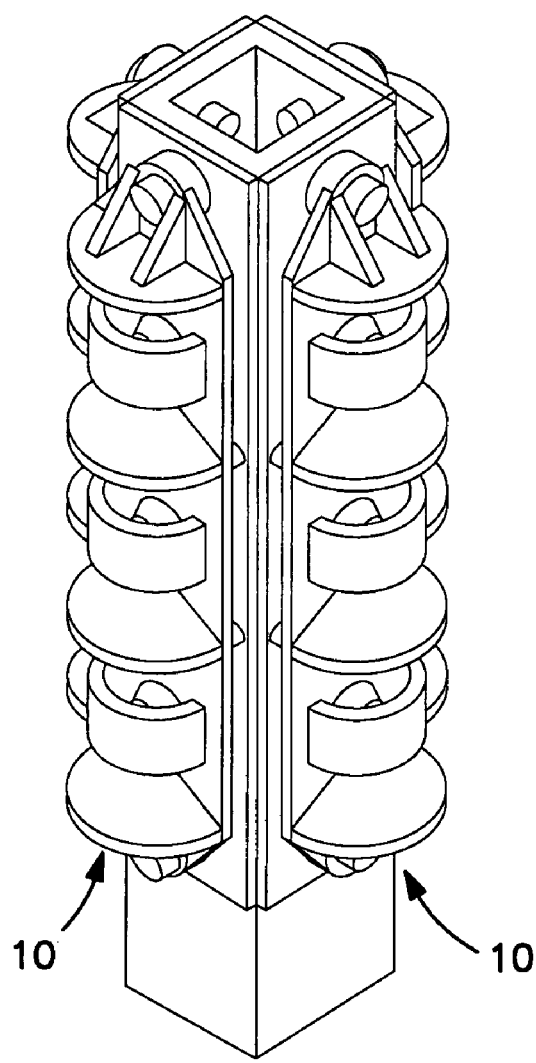
FIG. 12 is a perspective view of a light source employing alternative projection arrays according to aspects of the disclosure.

Referring to FIGS. 6 and 11, each light emitting diode 14 has an optical axis $A_o$ which passes through the semi-conductor chip (die) comprising the diode. The LED die, i.e., the source of light, thus lies in a plane $P_1$ that is perpendicular (normal) to optical axis $A_o$. It is to be noted that the individual segments 26 of the optical element arrays 24 have utility separate and apart from use in the disclosed linear arrays.

Figure 8:
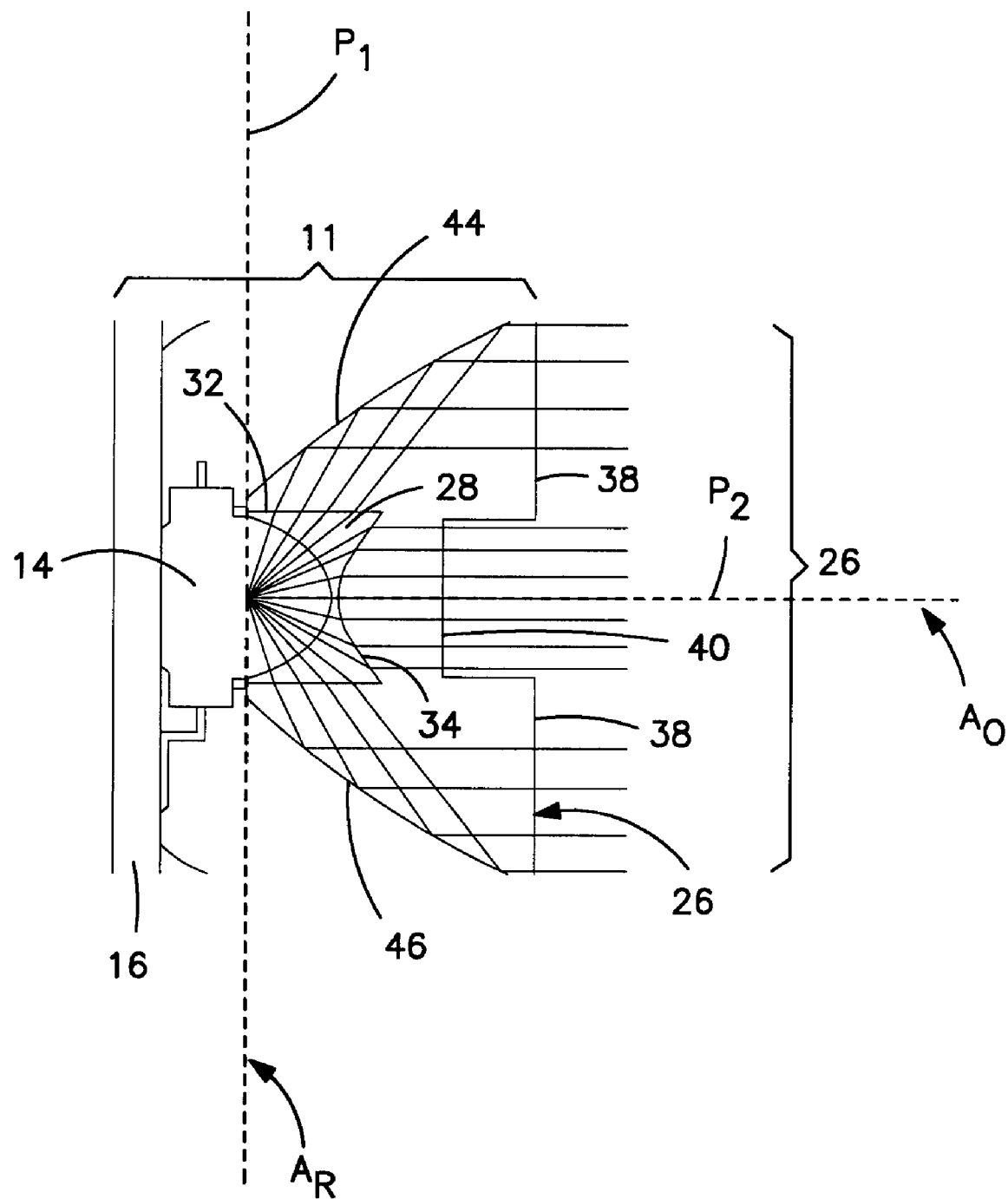
FIG. 8 is an enlarged partial longitudinal sectional view through a portion of a printed circuit board, LED and optical element of the warning signal light of FIGS. 1-3.

FIG. 8 is a sectional view through an LED light source 14 and optical array segment 26, which together form an illuminator 11. The optical array segment 26 is defined by the sectional shape shown in FIG. 8 rotated approximately 180° about axis of revolution $A_R$. Thus, the illustrated surfaces 32, 34, 38, 40, 44, and 46 become surfaces of revolution centered on the axis of revolution $A_R$.

Referring jointly to FIGS. 4-8, each optical array segment 26 includes a plurality of surfaces, with three groups of surfaces each performing a different optical function. Generally speaking, each optical array segment 26 includes a light entry surface 32, 34, a light emission surface 36 and an internal reflector 42. Each of these surfaces may be divided into discrete portions configured for a particular optical effect. More specifically, the light entry surface of each individual optical element 26 includes a pair of light entry portions 32 and 34 that together define a cavity 28. Light entry portions 32 and 34 are arranged to intercept substantially all of the light rays comprising the light flux emitted by an associated LED 14.

Each individual optical array segment 26 also includes an emission or radiator portion 36 which may be considered as comprising at least a pair of light emission surfaces 38 and 40 from which light is projected into the ambient environment. Finally, each optical element 26 has an internal reflector 42. As may best be seen from FIGS. 4-6 and 8, reflector 42 is actually comprised of a pair of surfaces 44 and 46 which are mirror images and which are oppositely disposed with respect to an associated cavity 28. Similarly, the light entry surface 32 is actually defined by a pair of surfaces 48 and 50 which are mirror images and which define two opposite sides of a cavity 28.

The light entry surfaces 48 and 50 and the reflection surfaces 44 and 46, through respective cooperative refraction and reflection, redirect the light rays from the LED light source such that they are emitted from optical element 26 in the form of light rays that are collimated in a first direction and divergent in a second direction which is perpendicular to the first direction. Thus, the shape of each of the internal reflecting surfaces 44, 46 is configured for cooperation with a corresponding light entry surface 48, 50.

As noted above, each optical element 26 comprises an emission portion 36 which, in the disclosed embodiments, has physically discrete plural emission surfaces 38 and 40 from which light is projected into the ambient environment. The first emission surface 38 is positioned to transmit light reflected from surfaces 44 and 46. In the disclosed embodiments, the emitter portion defined by surface 38 is configured such that the light rays will not be further redirected, i.e., the surface 38 is oriented relative to internal reflecting surfaces 44 and 46 such that surface 38 does not act as a refractor. In the embodiment of FIGS. 4-8, surface 38 is cylindrical and discontinuous, with the discontinuity being formed by second emission surface 40. In the embodiment of FIGS. 4-8, the discontinuity is not required for proper operation. Surface 38 is a surface of revolution defined by rotating a straight line about an axis of revolution $A_R$ that lies in the plane $P_1$ and passes through the LED die. In the disclosed embodiment, the line rotated about axis of revolution $A_R$ is parallel to the axis of revolution $A_R$.

The second emitter portion 40, in the embodiment of FIGS. 4-8, is also a surface of revolution defined by rotating a line about axis of revolution $A_R$, where the line being rotated is parallel to the axis of revolution $A_R$. In the embodiment of FIGS. 4-8, the line that defines emission surface 40 is a straight line and thus this emission surface is also cylindrical. Emitter portion 40 may, however, take a different shape as, for example, shown in FIGS. 9 and 10.

The second light entry portion 34 of optical element 26 is also a surface of revolution defined by rotation of a line about axis $A_R$. In the embodiment of FIGS. 4-8, the line which defines light entry portion 34 is a curve which, when rotated about axis of revolution $A_R$, creates an aspheric refracting surface which redirects light from the adjacent point source into a direction parallel to light reflected from internal reflecting surfaces 44 and 46. The light rays redirected by light entry portion 34 will pass through emitter portion 40 without the need for further redirection. The light rays radiated from surface 40 will thus be non-divergent in the same first direction (vertically) as the light rays from emission surfaces 38 and will also be divergent in the second transverse direction (horizontally). It should be noted that references to vertical and horizontal are dependent upon the orientation of the optical element.

Means for efficiently transferring heat away from the LED's 14 is depicted in FIGS. 1 through 3. The primary heat transfer component is the tubular member 18, which is, via the thermally conductive gasket 20, mechanically connected to the printed circuit boards 16 of the LED arrays 12. Thus, heat from the integral heat transmissive slugs of the individual LED's 14 is efficiently transferred to the tubular member 18 and, via member 18, conducted away from the LED's 14. The tubular member 18 may be comprised of aluminum or other heat transmissive material. In the present invention, if necessary, heat transfer away from the LED's may be enhanced by the installation of a fan 52, as shown in FIG. 2, within tubular heat transfer member 18. Power for operating the fan 52 may be delivered via circuit boards 16 and/or 27. FIG. 3 is a top view of the warning light device with the fan removed, showing the fins and screw receiving extruded features inside the tubular member 18. The tubular member 18 of the disclosed embodiment is an aluminum extrusion, but other materials and methods of manufacture are compatible with this component.

Figure 9:
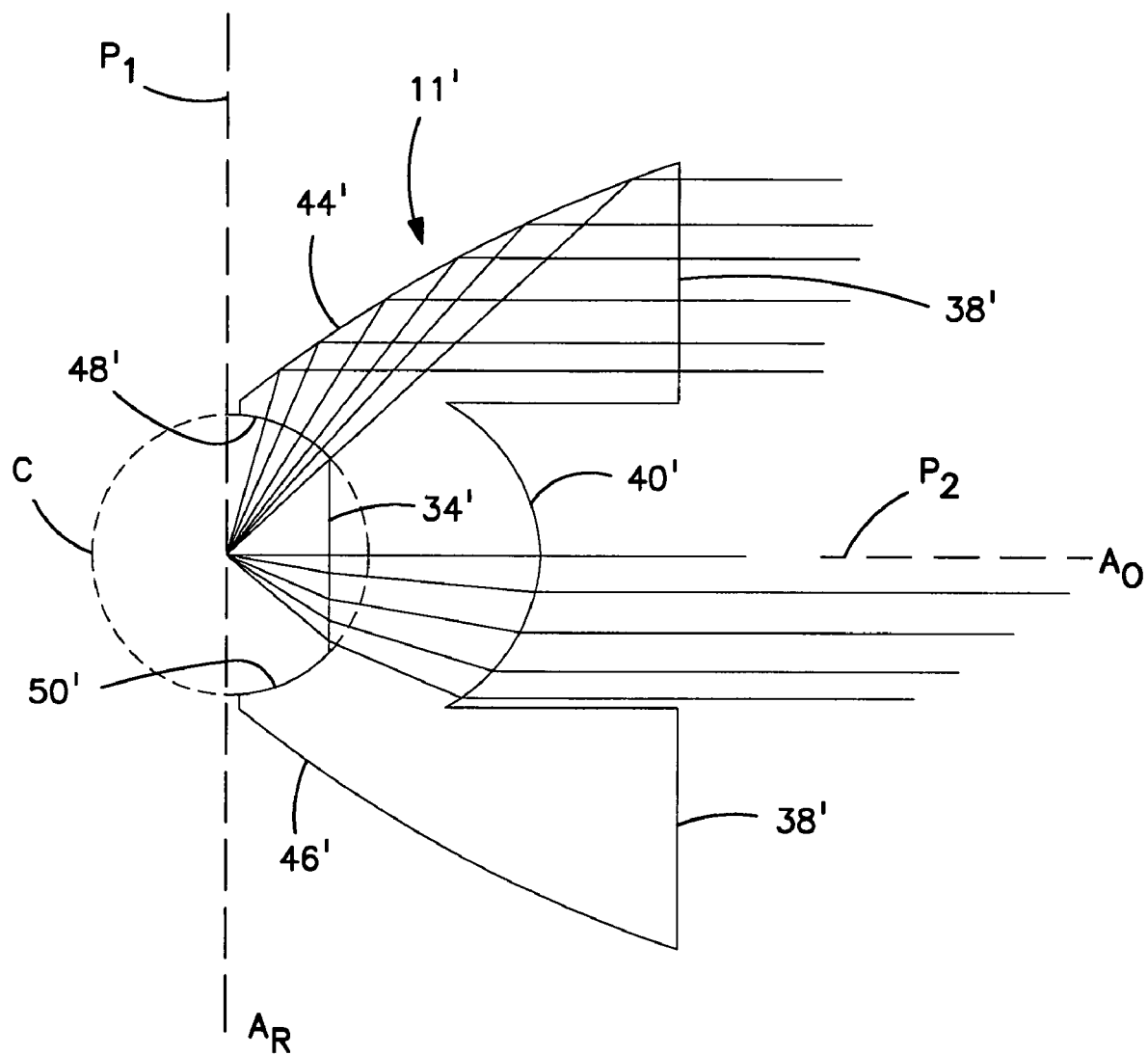
FIG. 9 is a longitudinal sectional view through an alternative optical element configuration according to aspects of the disclosure, shown with respect to a representative light source.
Figure 10:
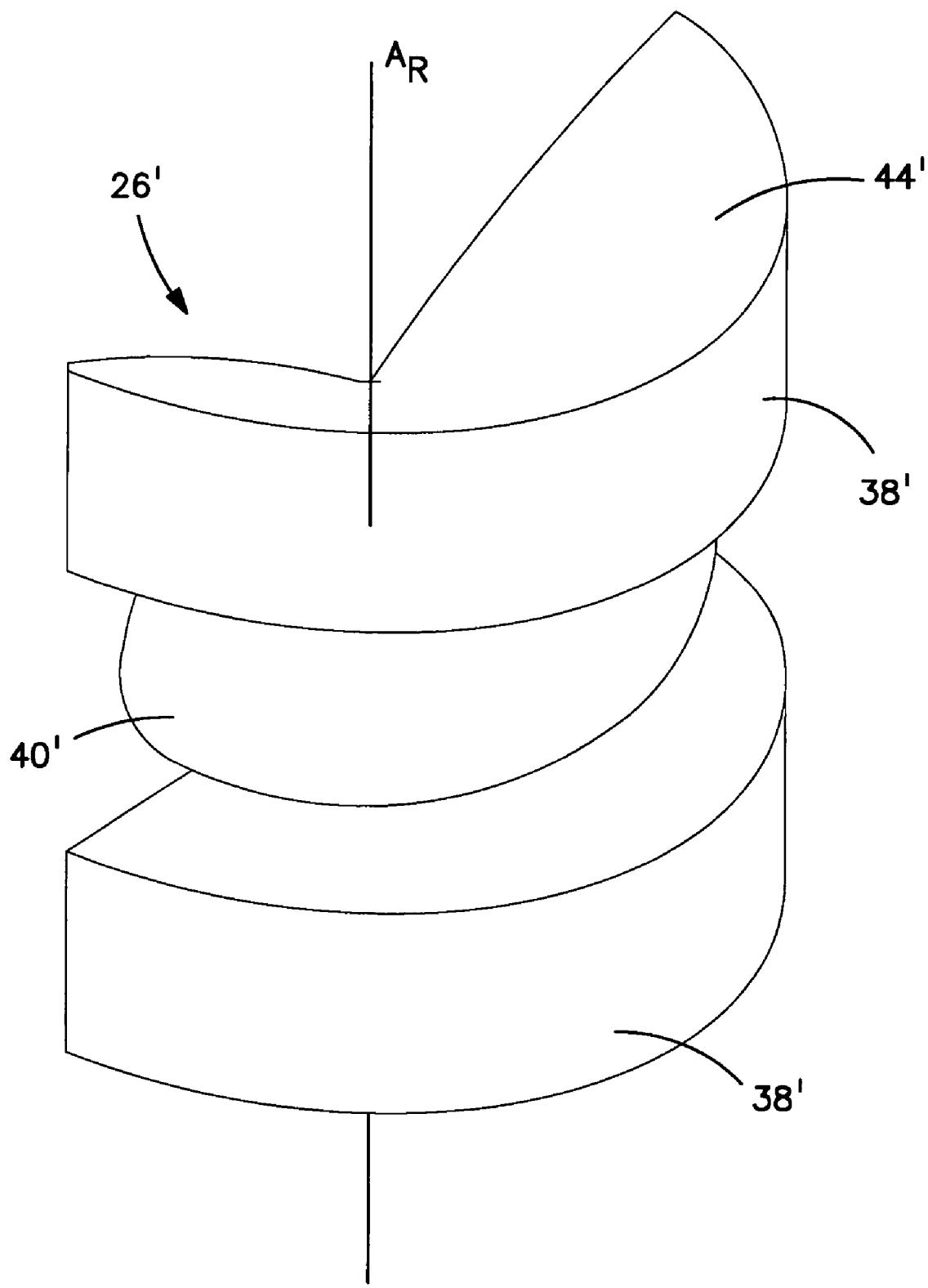
FIG. 10 is a perspective view from above of an optical element consistent with the optical element configuration shown in FIG. 9.

FIGS. 9 and 10 depict an illuminator 11' incorporating an alternative to the optical element 26 described above. In the FIG. 7 arrangement, the configuration of the light entry portions is altered, with the shape of the cooperating reflector and emission surfaces being changed so that the radiation pattern of the illuminator is similar to that of optical element 26, described above. Thus, the second light entry surface 34' in the FIG. 7 embodiment will not fully redirect intercepted light rays to the desired direction. Curved emission surface 40' is shaped to complement the refraction carried out by surface 34' so that light is radiated from emission surface 40' collimated in a first direction and divergent in a second direction perpendicular to the first direction, as described above. Light entry surfaces 48' and 50' are defined by segments of a circle C centered on the LED die. When the shape shown in FIG. 9 is rotated about axis of revolution $A_R$, which passes through the point of light emission, surfaces 48' and 50' are spherical surfaces of revolution arranged to allow light from the point source to pass through without refraction. Reflecting surfaces 44' and 46' are configured to redirect light passing through light entry surfaces 48', 50' into the desired radiation pattern. Emission portions 38' are similar in configuration and function to emission portions 38 described above. A straight line parallel to the axis of revolution $A_R$ defines light entry surface 34'. When rotated about axis of revolution $A_R$, this line becomes a cylindrical surface parallel to the axis of revolution $A_R$. This light entry surface shape does not change the direction of light incident upon it into the desired radiation pattern, so the corresponding emission portion 40' configured to complete the necessary change of direction as shown in FIG. 9. It will be apparent to those skilled in the art that complementary surfaces of the disclosed optical elements 26, 26' cooperate to produce a desired radiation pattern and are configured accordingly.

In the embodiment of FIGS. 9 and 10, light entry portions 48' and 50' of optical element 26' do not refract incident light. Instead, these surfaces allow all intercepted light rays to pass to the cooperating reflecting surfaces 44' and 46' without redirection. The reflecting surfaces 44' and 46' will thus also have a different paraboloidal configuration when compared to corresponding surfaces 44, 46 of optical element 26 described above. Again, the end result will be the projection, from the emission surfaces 38, 38', 40, 40' of each optical element 26, 26' of light that is collimated in a first direction and is divergent in a transverse direction.

Alternatively, emission surfaces 38, 38', 40, 40' may include distortions configured to alter the pattern of light emission in the vertical or horizontal direction. Such distortions may include bumps or pillow lenses (not shown) arranged to enhance the horizontal spread of emitted light. As a further alternative configuration, portions of optical element 26 may be combined with portions of optical element 26' to achieve the same or similar results to either optical element. Still further alternative embodiments may employ a suitably configured metallized reflector and curved collimating lens to achieve optically similar results.

Figure 13:
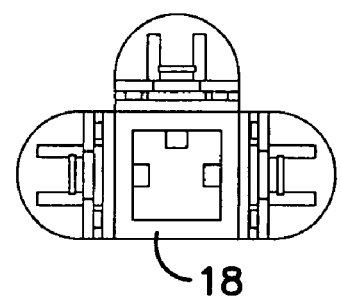
FIG. 13 is a top exploded view of the light source of FIG. 12.
Figure 13:
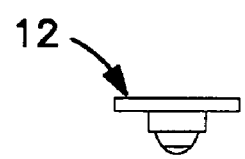
Figure 13:
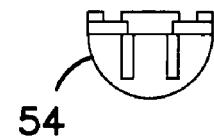
Figure 13:
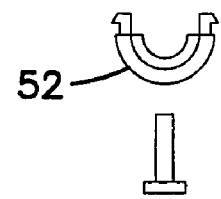
Figure 14:
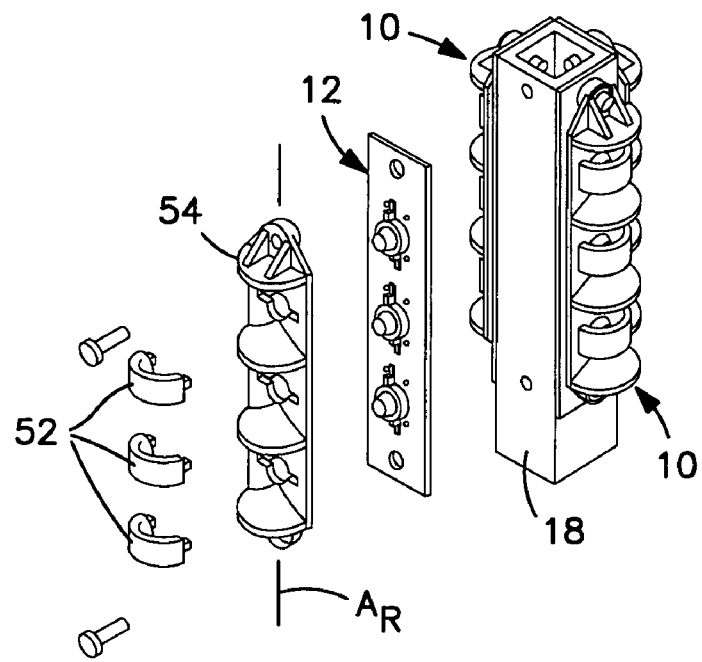
FIG. 14 is a perspective exploded view of the light source of FIG. 12.
Figure 15:
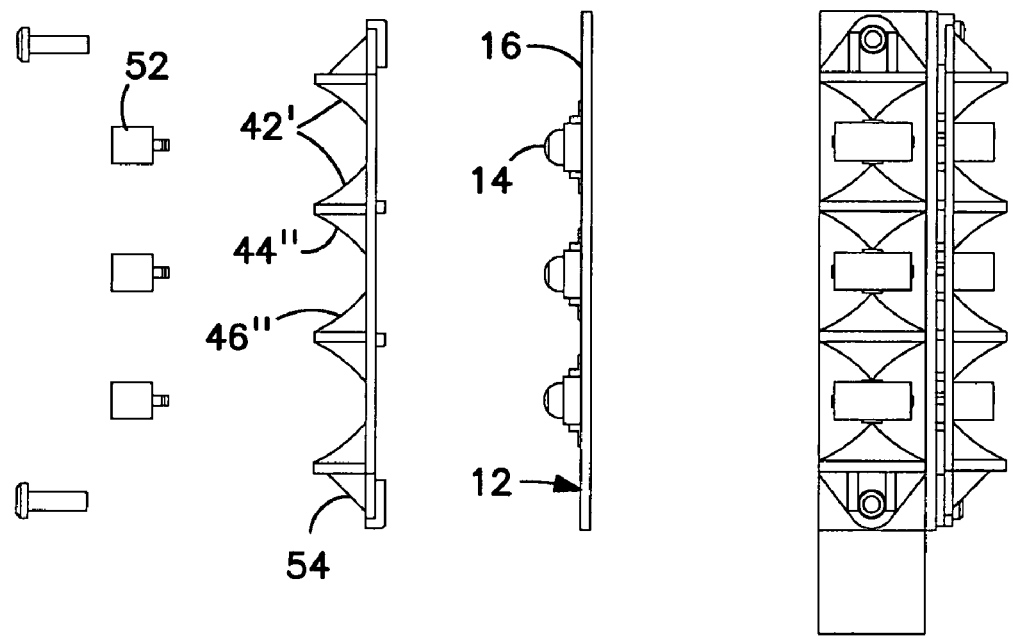
FIG. 15 is a side exploded view of the light source of FIG. 12.

FIGS. 12-15 illustrate an alternative embodiment of the disclosed sweep collimator which uses swept reflecting surfaces 44", 46" and a corresponding arcuate lens to achieve the same effect as the embodiments described in FIGS. 1-11. As shown in FIGS. 13-15, each illuminator includes a reflector 54 configured to place the swept reflecting surfaces 44", 46" in positions that will collimate wide angle light from each LED 14 in a first direction (the longitudinal direction of the LED array), without altering the angular path of the light in a second direction (perpendicular to the LED array). A separate collimating lens 52 is arranged to collimate narrow angle light from each LED 14 in a first direction (the longitudinal direction of the LED array), without altering the angular path of the light in a second direction (perpendicular to the LED array). The lens 52 illustrated in FIGS. 12-15 has a sectional shape similar to that defined by surfaces 34 and 40 of FIG. 4, and has substantially the same optical effect. The lens 52 may be configured with a sectional shape defined by the surfaces 34' and 40' of FIG. 9 or any combination of surface shapes that will perform the desired collimating function. The sectional shape defined by the selected surface configurations is swept about an axis of rotation $A_R$ passing through the area of light emission of the LED to provide the three dimensional configuration of the lens 52.

While exemplary embodiments have been set forth for purposes of illustration, the foregoing description is by way of illustration and not limitation. Accordingly, various modifications, adaptations and further alternatives may occur to one of skill in the art without the exercise of invention.

What is claimed is:

1. An illuminator comprising:
a light source having an area of light emission and an optical axis extending from said area of light emission, said light source radiating light in a substantially symmetrical pattern surrounding said optical axis on a first side of a first plane, said first plane passing through said area of light emission and perpendicular to said optical axis;
an optical element positioned to intercept said radiation pattern, said optical element bisected by a second plane including said optical axis and perpendicular to said first plane, said optical element substantially defined by a light entry surface, a reflecting surface and a light emission surface, each of said surfaces being a surface constructed about and centered on a second axis passing through said area of light emission and located in said first plane, said light entry surface, reflecting surface and light emission surface configured to produce a radiation pattern from said emission surface that is collimated with respect to said second plane and divergent with respect to said optical axis.

2. The illuminator of claim 1, wherein said light entry surface defines a cavity.

3. The illuminator of claim 1, wherein said light source comprises an LED.

4. An illuminator comprising:
an LED light source that when energized by electrical current emits light from a light emitting die in a divergent radiation pattern surrounding an optical axis and on a first side of a first plane perpendicular to said optical axis, said radiation pattern including wide angle light emitted at greater than a first angle relative to a second plane perpendicular to said first plane and including said optical axis and narrow angle light emitted at less than said first angle relative to said second plane; and
reflecting surfaces positioned on opposite sides of said second plane, each of said reflecting surfaces being defined by rotation of a curve about a second axis in said first plane,
wherein said reflecting surfaces redirect wide angle light into an emission pattern substantially parallel to said second plane and divergent with respect to said optical axis.

5. The illuminator of claim 4, wherein said direction substantially parallel to said second plane is a direction within plus or minus 5 degrees of parallel to said second plane.

6. The illuminator of claim 4, comprising an elongated, arcuate collimating lens arranged to redirect narrow angle light to a direction substantially parallel to said second plane and divergent with respect to said optical axis, said collimating lens longitudinally bisected by said second plane and traversing an arc of approximately 180° centered on said second axis.

7. An illuminator comprising:
a light emitting diode (LED) comprising a light emitting die in a first plane and having an optical axis extending from the light emitting die perpendicular to the first plane, said LED emitting light within a hemisphere centered on said optical axis on one side of said first plane;
an optical element having a plurality of surfaces centered on a second axis perpendicular to said optical axis, said optical element bisected by a second plane including said optical axis and perpendicular to said first plane, said plurality of surfaces defining first and second light entry portions positioned to intercept at least a substantial portion of the light from said LED, said plurality of surfaces further comprising a reflector and a light emission surface, said first light entry portion comprising a pair of surfaces separated by and spaced from said second plane, said pair of surfaces and said reflector cooperating to redirect a first portion of light from said LED toward said emission surface, said second light entry portion positioned intermediate said pair of surfaces and cooperating with said emission surface to redirect a second portion of light from said LED, said redirected light radiated from said emission surface in an illumination pattern which is substantially collimated with respect to said second plane and divergent with respect to said optical axis; and
a support for said LED, said support positioning said LED adjacent to and spaced from said light entry portions of said optical element.

8. The illuminator of claim 7, wherein at least one of said light entry portions, said light emission surface and said reflector are surfaces of revolution defined by rotation of a line or a curve about said second axis.

9. The illuminator of claim 7, wherein at least two of said light entry portions, said light emission surface and said reflector are surfaces of revolution defined by rotation of a line or a curve about said second axis.

10. The illuminator of claim 7, wherein each of said light entry portions, said light emission surface and said reflector are surfaces of revolution defined by rotation of a line or a curve about said second axis.

11. The illuminator of claim 7, wherein said first and second light entry portions together define a cavity having an opening facing said LED.

12. The illuminator of claim 7, wherein said reflector comprises a pair of mirror image surfaces separated by said second plane, each of said pair of mirror image surfaces redirecting light entering said optical element through a respective of said first light entry portion pair of surfaces.

13. The illuminator of claim 7, wherein substantially collimated is a direction within plus or minus 5 degrees of parallel to said second plane.

14. The illuminator of claim 7, wherein at least a portion of said light emission surface is a cylindrical surface centered on said second axis.

15. The illuminator of claim 7, wherein at least a portion of said light emission surface includes distortions configured to alter the direction of light radiated from said emission surface with respect to said optical axis without altering the illumination pattern with respect to said second plane.

16. The illuminator of claim 7 wherein at least one of said plurality of surfaces includes distortions configured to alter the direction of light radiated from said emission surface with respect to said optical axis without altering the illumination pattern with respect to said second plane.

17. The illuminator of claim 7, wherein said reflector comprises a pair of mirror image surfaces separated by said second plane, each of said pair of mirror image surfaces being an internal surface of said optical element arranged so that light entering said optical element through respective of said first light entry portion pair of surfaces is internally reflected toward said light emission surface.

18. The illuminator of claim 7, wherein said light entry portions, said light emission surface and said reflector are constructed about and centered on said second axis.

19. The illuminator of claim 7, wherein said reflector comprises two surfaces separated by said second plane, each of said surfaces defined by rotation of an aspheric curve about said second axis, said aspheric curve extending from an inner end adjacent said second axis to an outer end, said inner end being closer to said second plane than said outer end.

20. The illuminator of claim 7, wherein said light emission surface includes a central portion bisected by said second plane, said central portion defined by a curve rotated about said second axis, said curve having first and second ends closer to said second axis than a center of said curve where said curve intersects said second plane.

21. The illuminator of claim 7, wherein said second light entry portion is a cylindrical surface centered on said second axis.

22. The illuminator of claim 7, wherein said second light entry surface is defined by a curve rotated about said second axis, said curve being convex with respect to said second axis.

23. The illuminator of claim 7, wherein said first light entry portion pair of surfaces are substantially planar surfaces defined by rotation of a line about said second axis.

24. The illuminator of claim 1, wherein each of said light entry surface, said reflecting surface and said light emission surface are surfaces of revolution defined by rotation of a line or a curve about said second axis.

25. The illuminator of claim 1, wherein at least one of said light entry surface, said reflecting surface or said light emission surfaces are surfaces of revolution defined by rotation of a line or a curve about said second axis.

26. The illuminator of claim 4, wherein said reflecting surfaces are defined by rotation of an aspheric curve approximately 180° about said second axis.

27. The illuminator of claim 26, wherein said aspheric curve extends from an inner end adjacent said second axis to an outer end, said inner end being closer to said second plane than said outer end.

28. The illuminator of claim 6, wherein said collimating lens includes a light entry surface facing said LED light source and an opposed light emission surface, at least one of said light entry or light emission surfaces being defined by a curve rotated about said second axis.

29. The illuminator of claim 4, wherein said first angle is about 35°.

* * * * *